United States Patent
Nii et al.

(10) Patent No.: US 6,680,814 B2
(45) Date of Patent: *Jan. 20, 2004

(54) SPINDLE MOTOR AND MAGNETIC DISC DEVICE WITH HYDRODYNAMIC BEARINGS

(75) Inventors: Katsutoshi Nii, Hitachi (JP); Masaru Muranishi, Odawara (JP); Shozo Saegusa, Ibaraki-ken (JP); Tsuyoshi Takahashi, Odawara (JP); Kenji Tomida, Odawara (JP); Takashi Matsuki, Odawara (JP); Yuuichi Yanagase, Ibaraki-ken (JP); Mitsuyuki Tsuyuki, Kanagawa-ken (JP); Shinobu Yoshida, Tsuchiura (JP); Hiroshi Nishida, Kanagawa-ken (JP); Kazuhiko Kawakami, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/232,690

(22) Filed: Sep. 3, 2002

(65) Prior Publication Data

US 2003/0011929 A1 Jan. 16, 2003

Related U.S. Application Data

(60) Continuation of application No. 09/504,043, filed on Feb. 14, 2000, now Pat. No. 6,469,866, which is a division of application No. 09/504,043.

(30) Foreign Application Priority Data

Feb. 16, 1999 (JP) .............................................. 11-036821
Dec. 3, 1999 (JP) .............................................. 11-344211

(51) Int. Cl.$^7$ .............................................. G11B 19/20
(52) U.S. Cl. .............................................. 360/99.08
(58) Field of Search ........................... 360/99.07, 99.08, 360/99.04, 99.11; 369/208; 310/90; 384/100, 107, 112, 115, 123, 450

(56) References Cited

U.S. PATENT DOCUMENTS

| | | | |
|---|---|---|---|
| 5,013,947 A | 5/1991 | Ide | 310/67 R |
| 5,541,460 A | 7/1996 | Dunfield et al. | 310/67 R |
| 5,901,013 A | 5/1999 | Lee et al. | 360/98.08 |
| 5,973,878 A | 10/1999 | Yoshida et al. | 360/98.08 |
| 5,977,674 A | 11/1999 | Leuthold et al. | 310/90 |
| 6,016,238 A | 1/2000 | Yoshikawa et al. | 360/98.08 |
| 6,046,881 A | 4/2000 | Tielemans et al. | 360/98.08 |
| 6,118,620 A | 9/2000 | Grantz et al. | 360/98.08 |
| RE36,931 E | 10/2000 | Grantz et al. | 360/99.08 |
| 6,144,523 A | 11/2000 | Murthy et al. | 360/98.08 |
| 6,211,592 B1 | 4/2001 | Ichiyama | 310/90 |
| 6,219,199 B1 | 4/2001 | Sakuragi et al. | 360/98.08 |
| 6,236,535 B1 | 5/2001 | Gilliland et al. | 360/98.08 |
| 6,243,230 B1 | 6/2001 | Nii et al. | 360/98.08 |
| 6,252,322 B1 | 6/2001 | Kawawada et al. | 310/90 |
| 6,271,612 B1 | 8/2001 | Tanaka et al. | 310/90 |
| 6,313,967 B1 | 11/2001 | Bodmer et al. | 360/98.08 |
| 6,469,866 B1 * | 10/2002 | Nii et al. | 360/99.08 |

FOREIGN PATENT DOCUMENTS

| | | |
|---|---|---|
| JP | 6-223494 | 8/1994 |
| JP | 10-146014 | 5/1998 |
| JP | 10-267036 | 10/1998 |
| JP | 11-283321 | 10/1999 |
| JP | P200028315 | 10/2000 |

* cited by examiner

Primary Examiner—Tianjie Chen
(74) Attorney, Agent, or Firm—Antonelli, Terry, Stout & Kraus, LLP

(57) ABSTRACT

A spindle motor used in a magnetic disc apparatus having a hub to which a magnetic disc is mounted and a rotary shaft to which the hub is fixed. The rotary shaft is located in a bearing casing having one end opened and the other end closed by a hydrodynamic pressure radial bearing, the rotary shaft being supported by a hydrodynamic pressure thrust bearing and the hydrodynamic pressure radial bearing. An inner diameter D and a width L of the hydrodynamic pressure radial bearing having a relationship of L/D<1.

10 Claims, 12 Drawing Sheets

I-I SECTION

II-II SECTION

SPINDLE MOTOR AND MAGNETIC DISC DEVICE WITH HYDRODYNAMIC BEARINGS

CROSS REFERENCE TO RELATED APPLICATION

This is a continuation of U.S. application Ser. No. 09/504,043, filed Feb. 14, 2000 now U.S. Pat. No. 6,469,866, the subject matter of which is incorporated by reference herein and is related to U.S. application Ser. No. 10/214,576, filed Aug. 9, 2002, which is a divisional application of U.S. application Ser. No. 09/504,043.

BACKGROUND OF THE INVENTION

The present invention relates to a magnetic disc device in a data processing device, and in particular to a magnetic disc device which incorporates a thin spindle motor having an enhanced shock resistance.

Magnetic disc devices for data processing systems have capacities which have recently become larger and lager, and recording densities which have become higher and higher. In particular, as to a magnetic disc device used in a personal computer, an electronic camera or other portable electronic devices, its portability is important, and further, a thin thickness, a shock resistance, low noise and low power consumption are required therefor.

By the way, a conventional spindle motor for driving a disc has used therein ball bearings so as to maintain precise rotation in order to aim at increasing the capacity of a magnetic disc device and at heightening the data recording density. However, the spindle motor using ball bearings, for driving a magnetic disc has a limitation on enhancing the rotational precision. Accordingly, there has been proposed a spindle motor using hydrodynamic fluid bearings, for driving a magnetic disc, as disclosed in Japanese Laid-Open Patent No. H6-223494, Japanese Laid-Open Patent No. H10-267036 and Japanese Laid-Open Patent No. H10-146014. That is, by using the hydrodynamic fluid bearings, it is possible to aim at enhancing the rotational precision and carry out axial positioning with the use of a magnetic attraction of the motor in view of requirement for the attaching posture and the portability of the motor.

Further, a magnetic disc device incorporated in a personal computer or an electronic camera, would be accidentally exerted thereto with an impact force upon dropping during attachment or portage, and accordingly, it is required for the magnetic disc to maintain the ability of recording or reproducing of data even though an impact is exerted thereto. The shock resistance for ball bearings is about 500 G. Note type personal computers in these days cannot cope with a shock resistance up to 1,000 G (upon dropping) if bearings other than ball bearings are used therein.

In the hydrodynamic fluid bearings, a herringbone groove for inducing hydrodynamic pressure is typically formed in a rotary shaft or a baring surface, and accordingly, the rotary shaft is supported by a fluid pressure which is produced on a bearing surface by rotation of the shaft. Further, the Japanese Laid-Open Patent No. H6-223494 or the Japanese Laid-Open Patent No. H10-267036 discloses such an arrangement that two bearings are normally used so as to precisely rotate a rotary body. Further, the Japanese Laid-Open Patent No. H10-146014 discloses a relationship between the inner diameter D and the width L of a bearing is set to L/D>1 in order to precisely support a rotary body with the use of a single bearing, so as to have a required bearing stiffness. If the above-mentioned bearing device is used for a spindle motor for driving a magnetic disc, it is possible to obtain rotation with higher precision, and to aim at enhancing noise reduction and shock resistance in comparison with a motor using ball bearings.

By the way, as to a magnetic disc device mounted in an electronic device, the posture and the handling of the device cannot be specified, and accordingly, these facts should be taken into consideration for this magnetic disc device. Further, note type personal computers have recently been thinner and thinner, and accordingly, the housing of the device is required to have a height of 12.5 to 9.5 mm or 6.5 mm. Accordingly, if conventional dynamic pressure bearings are used, a required bearing stiffness cannot be obtained for these devices due to restriction on axial dimensions.

That is, it is required for a spindle motor for driving a magnetic disc, that the deflection of the rotary shaft of a bearing is restrained to be less than 0.5 $\mu$m so as to precisely support the magnetic disc. By the way, since the height of the housing of the device is low, that is, 12.5 to 9.5 mm or 6.5 mm, the axial height of a bearing part has to be a value in a range of 3 to 5 mm or 3 to 6 mm. With such dimensions of the bearing part of the bearing device, the width of the bearing is small so that a required bearing rigidity cannot be obtained, and accordingly, two hydrodynamic fluid bearings can hardly be arranged in the housing. In particular, if the height of the housing is 6.5 mm, no thin bearings which can cope with such a height, are commercially available even though ball bearings are to be used. Thus, bearings having special specifications have to be used, and as a result, there would be caused such disadvantage that not only the cost would be increased but also the shock resistance would be lowered.

Further, in a magnetic disc device attached to a personal computer, a magnetic disc is fixed in a center clamp system by means of a rotary shaft as will be detailed hereinbelow. Accordingly, the minimum diameter of the rotary shaft in these magnetic disc devices becomes larger than 3 mm in view of the relationship between a bearing load exerted to the magnetic disc, and dimensions of clamp screws. Further, it is required to restrain the radial gap of the bearing from exceeding 2 $\mu$m so as to decrease the static inclined angle of the rotary shaft in view of restriction to the dimensions of spacing between a magnetic disc and a head for reading and writing date. Meanwhile, in a conventional shaft support mechanism in which vibration is restrained by means of two radial bearings, a rotary shaft has to have a diameter larger than at least 4 mm in order to obtain a required the stiffness of shaft supporting if the height of the housing is low, that is, 12.5 to 9.5 mm or 6.5 mm. However, in such a conventional shaft support mechanism, if the minimum diameter of the rotary shaft is set to a value in a range from 3 mm to 4 mm, the bearing loss is increased, and accordingly, this mechanism can hardly be used for a personal computer or other electronic equipment.

Further, if the height of the housing of the bearing device becomes 5.9 mm or 5 mm, the sealing of the bearing device is difficult with the use of a single seal part due to the dimensional restriction, and accordingly occurrence of leakage of lubrication oil filled in a spindle motor cannot be prevented. In particular, since no contamination is allowed for a magnetic disc in a magnetic disc device, it is necessary for a spindle motor using hydrodynamic fluid bearings, for driving a magnetic disc, to take care of oil leakage, and accordingly, a highly reliable seal is required.

Meanwhile, if hydrodynamic fluid bearings are used, no noise occurs from the bearings. However, in a motor disclosed in the Japanese Laid-open Patent No. H10-267036, the magnetic center of a motor stator is shifted from that of a magnet for driving the motor so as to effect axial pressurization, and accordingly, there is a possibility of occurrence of electromagnetic sound. Further, in a motor disclosed in the Japanese Laid-Open Patent No. H6-223494, the axial positioning is carried out at a thrust bearing surface so as to align the magnetic center of the motor, and a ring-like magnetic plate is arranged at a position opposing an end face of a motor driving magnet so that axial pressurization is effected by thus obtained magnetic attraction force, thereby sustantialy no magnetic sound is produced. With this arrangement, if a thin motor is used, a gap between the end face of the motor driving magnet and the magnetic plate would be 0.1 mm or more or less, and accordingly the control of the gap is difficult. As a result, no constant magnetic attraction force is possibly obtained. Thus, even the hydrodynamic fluid bearing incurs the above-mentioned problems when it is used in a thin magnetic disc device.

SUMMARY OF THE INVENTION

The present invention is devised in view of the above-mentioned problems inherent to the conventional technology, and an object of the present invention is to propose a spindle motor which can effectively utilize the features of hydrodynamic fluid bearings, and which is thin and shock-resistant, and which exhibits a low noise and low power consumption, and a magnetic disc device utilizing the spindle motor, so as to provide a personal computer and other electronic devices which can use hydrodynamic fluid bearings and which excellent in portability.

According to a first aspect of the present invention, there is provided such an arrangement that a rotary shaft is rotatably supported by a hydrodynamic fluid radial bearing and a hydrodynamic fluid thrust bearing as first vibration restraint means, the radial bearing supporting a shaft translation mode of vibration components due to unbalance forces exerted to the rotary shaft, and the thrust bearing supporting a conical mode thereof in order to maintain rotation with a high degree of precision. That is, a moment load caused by an unbalance force of a rotary body is balanced with a moment rigidity caused by hydrodynamic pressure induced by the thrust bearing so as to restrain vibration of a conical mode, and vibration in a translation mode is supported by the radial bearing. Thus, the relationship between the width L and the inner diameter D of the bearing is set to L/D<1 in order to precisely support a magnetic disc.

It is noted here that the bearing width L is an effective bearing width measured in the axial direction of the rotary axis at a bearing surface which carries out bearing action, and excluding the dimensions of chamfered part in the end parts thereof. Further, the bearing inner diameter D is a half of the bearing surface which carries out bearing action and which is measured in the radial direction.

According to the present invention, loads can be received by the above-mentioned radial bearing and the thrust bearing, and the inner diameter of the hydrodynamic fluid radial bearing is set to a value in a range from about 4 to 5 mm in view of the bearing stiffness of the thrust bearing and a loss in the radial bearing while the relationship between the inner diameter D of the bearings and the width L is optimized to L/D=2.0 to 0.5 in order to precisely support the magnetic disc while reducing the bearing loss.

That is, in a conventional magnetic disc device, the diameter of the rotary shaft has been determined in view of a bending stiffness of a shaft and a loss of a radial bearing. In the motor according to the present invention, the diameter of the rotary axis is determined in view of a moment load caused by an unbalance of the rotor and a moment stiffness of the thrust bearing. Accordingly, in the magnetic disc deice according to the present invention, the relationship between the inner diameter D and the width L of the radial bearing is set to L/D<1 in order to maintain precise rotation in combination of the thrust bearing.

In addition to these matters, the moment stiffness of a thrust bearing is used, and accordingly, the width L of the radial bearing is reduced to a value in a range of 1 to 2 mm in view of a shock load and a bearing loss so as to reduce the bearing loss without hindering a bearing function, and further, the inner diameter D of the radial bearing is increased to a value in a range from 5 to 4 mm so as to increase the moment stiffness of the thrust bearing in order to cope with lowering of the rigidity of the radial bearing caused by a decrease in the width of the bearing, thereby it is possible to maintain precise rotation and to reduce the bearing loss.

Further, in addition to the first means, magnetic fluid is used as lubrication oil for the bearings while a rotary shaft which is magnetically permeable (made of a material having a high magnetic permeability or a magnetic material), and radial and thrust bearings which are magnetically permeable or which are made of a magnetic material are used while a permanent magnet is located between the radial bearing and the thrust bearing. Accordingly, the bearing and the magnetic fluid are magnetized so as to hold the magnetic fluid at the slide surfaces of the bearings. Thereby it is possible to ensure lubrication and to effect a magnetic attraction force which can prevent the magnetic fluid filled in the bearing device from leaking from the bearing device.

DESCRIPTION OF THE PREFERRED EMBODIMENT

Figure 1:
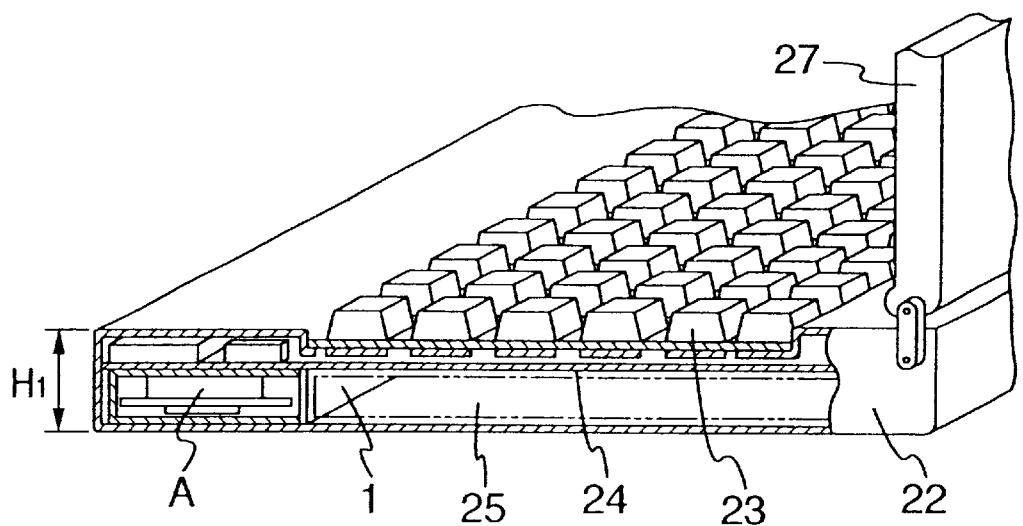
FIG. 1 is a partly sectioned perspective view illustrating a personal computer.

Explanation will be hereinbelow made of embodiments of the present invention with reference to the drawings. FIG. 1 is a partly sectioned view illustrating a note type personal computer.

The personal computer is composed of a display part 27 formed of a liquid crystal panel, for displaying data, and a body part 22 incorporated therein with a keyboard 23, a magnetic disc device 1, electronic parts 25, and a board on which the electronic parts 25 and the like are mounted. The thickness $H_1$ of the body 22 has been decreased recently to around 20 mm. According to the present invention, in order to realize a thin personal computer, the magnetic disc device incorporated in the body 22 becomes thinner. In order to decrease the thickness of the magnetic disc 1, a spindle motor A to be mounted for driving a magnetic disc, has a height of less than 10 mm. Explanation will be hereinbelow made of how to decrease the thickness of the spindle motor.

Figure 2:
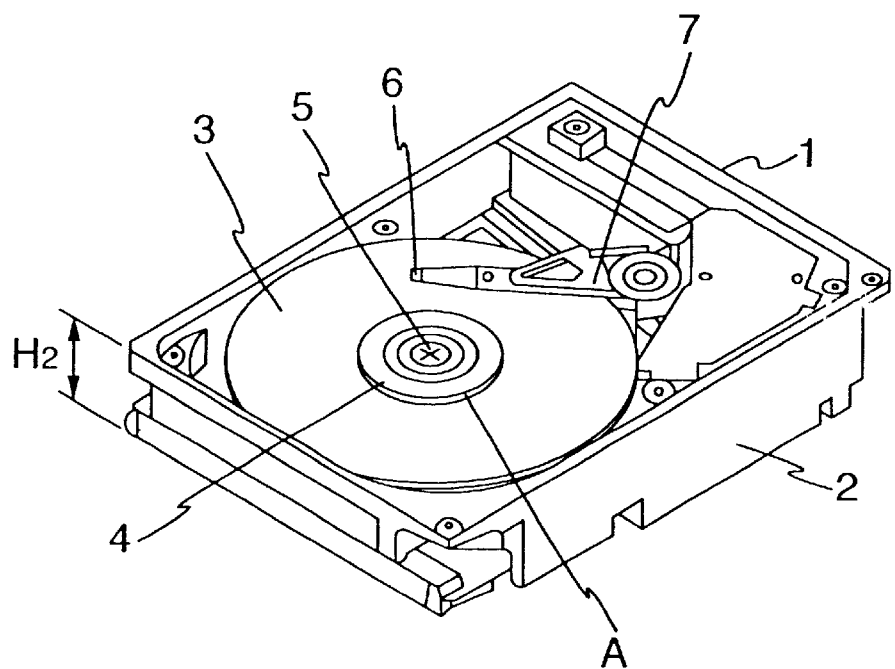
FIG. 2 is a perspective view illustrating a magnetic disc device.

FIG. 2 is a perspective view illustrating an exterior of the magnetic disc device used in a personal computer or the like.

The magnetic disc device is mainly composed of, within a housing 2, a magnetic disc 3 for recording data, a magnetic head 6 provided at the distal end of a carriage 7, for recording and reproducing data, and a spindle motor A for driving the magnetic disc 3. The magnetic disc 3 is fixed in a center clamp system, that is, as shown in this figure, the magnetic disc 3 is fixed to the spindle motor A by a clamp screw 5 through the intermediary of a damper 4. A cover is attached to a housing 2, which is not shown in the figure for the sake of brevity in explanation, and the housing 2 having a height $H_2$ of about 12.5 mm is prosperously used in the case of a desk-top type personal computer. Those having $H_2$=about 9.5 mm or 6.5 mm are prosperously used in the case of a note type personal computer.

Figure 3:
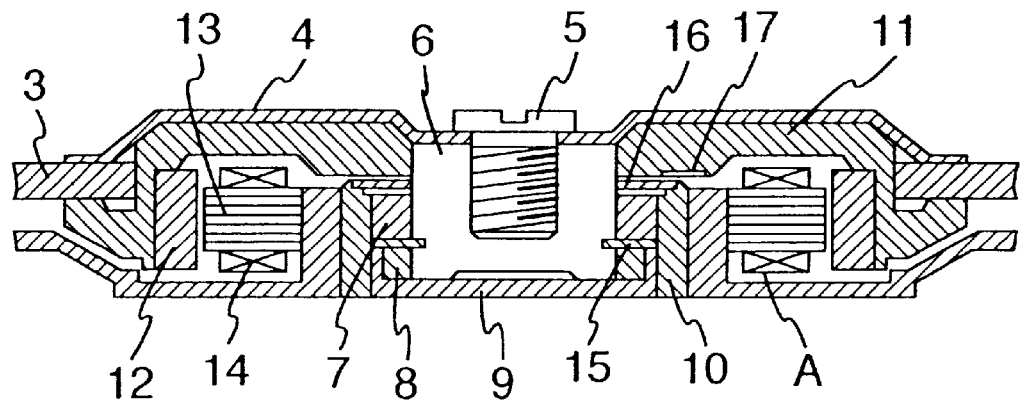
FIG. 3 is a longitudinally sectional view illustrating a structure of a spindle motor, according to the present invention, for driving a magnetic disc.

FIG. 3 is a longitudinal sectional view which shows an embodiment of a spindle motor part of a magnetic disc device according to the present invention.

The spindle motor A for driving the magnetic disc 3 is composed of a multipole-magnetized rotor magnet 12, an armature winding 14A for generating a magnetic field, and an armature core 13, which are incorporated in the bore part of the hub 11. This armature core 13 is fitted on a protrusion formed in the housing 2. The hub 11 is fastened thereto with a magnetically permeable rotary shaft 6 having a diameter of about 5 mm, and the magnetic disc 3 is fixed to the hub 11 by means of a clamp screw 5 through the intermediary of a damper 4. Further, in a bearing part, a ring-like evaporation restraint panel 16, a magnetically permeable dynamic pressure radial bearing 7 having a width of less than 2 mm, a permanent magnet 8, a stopper ring 15, a magnetic permeable dynamic pressure thrust bearing 9 are arranged coaxially in the mentioned order as viewed from the opening side of a non-magnetic bearing casing 10, and magnetic fluid 9 for lubrication is charged in the bearing part. Since the magnetic fluid is subjected to magnetic force by the permanent magnet 8, no leakage of the magnetic fluid occurs during usual handling or rotation of the spindle motor A.

Figure 10:
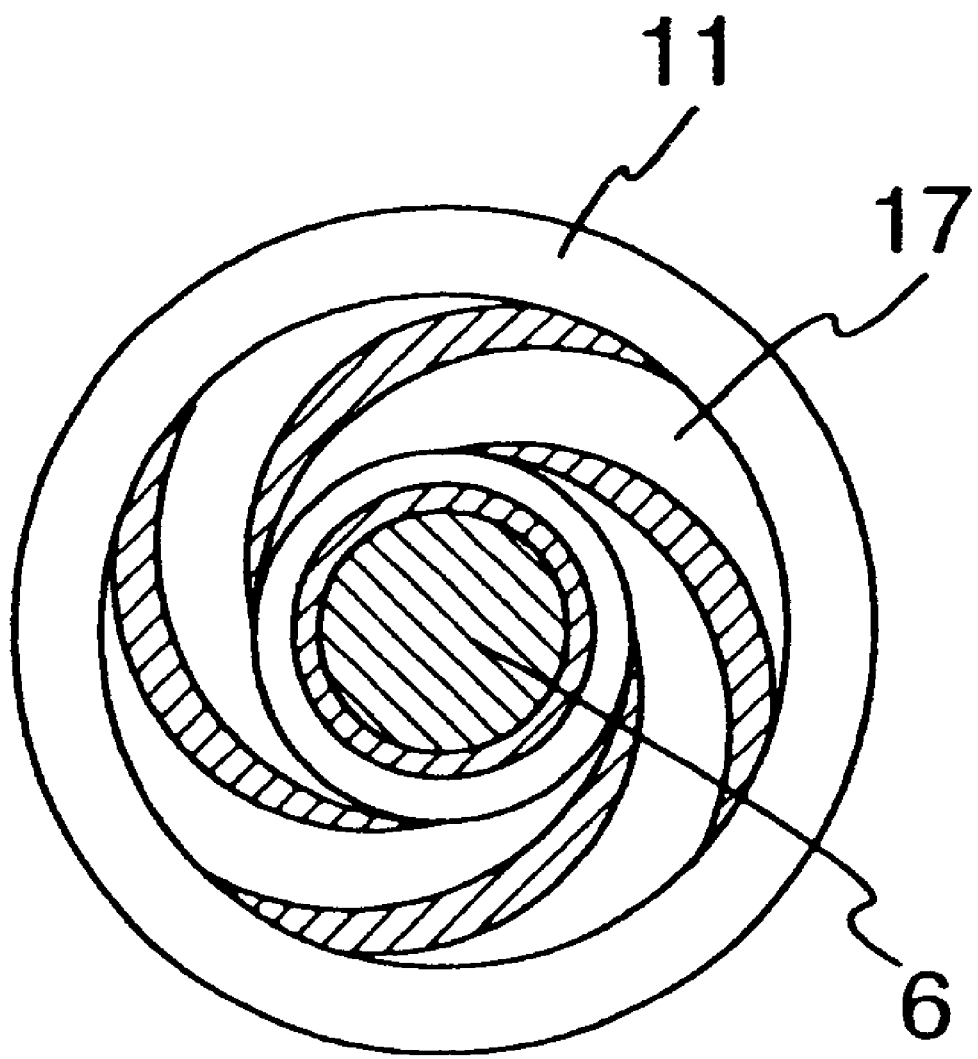
FIG. 10 is a plan view illustrating an embodiment of a spiral groove formed in a hub, for inducting a hydrodynamic pressure.

Further, in this embodiment, even in such a case that a shock force is exerted to the magnetic disc device 1 so that the magnetic fluid 19 charged in the bearing device scatters into a gap defined between the an end face of the ring-like evaporation restraint panel 16 located on the opening side of the bearing casing 10, and the surface of the hub 11, the magnetic fluid 19 is prevented from scattering toward the motor stator 13. That is, a spiral groove 17 is formed in the surface of the hub 11 opposed to the opening end part of the bearing casing 10, as shown in FIG. 10 so as to pull back the magnetic fluid scattering in the above-mentioned gap, through the rotation of the hub 11. This spiral groove may be formed in the end face of the ring-like evaporation restraint panel 16 so as to obtain similar technical effects.

Figure 4:
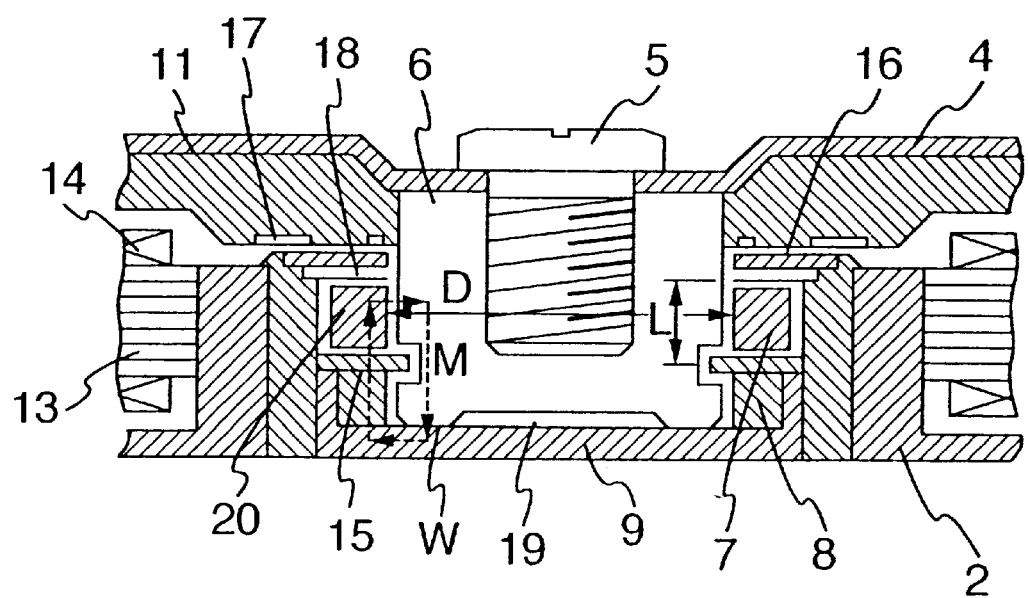
FIG. 4 is a longitudinally partly sectional view illustrating a structure of a spindle motor for driving a magnetic disc device according to the present invention.

FIG. 4 is a sectional view illustrating the bearing part or the bearing device.

The shaft 6 fitted in the hub 11 is rotatably supported by the hydrodynamic fluid radial bearing 7 and the hydrodynamic fluid thrust bearing 9 which are arranged at opposite ends of the permanent magnet 8 for holding the magnetic fluid 19 in the bearing casing 10 so as to support an axial load at the end face of the rotary shaft 6. Further, the stopper ring 15 is held on the outer peripheral side thereof between the thrust bearing 9 and the radial bearing 7. The inner peripheral side of the stopper ring 15 is arranged in a groove part formed in the shaft in a non contact condition, and accordingly, the shaft 6 is prevented from coming off in the axial direction. Further, the ring-like evaporation restraint panel 16 (a gap between itself and the shaft 6 is set to 10 to 20 $\mu$m) is provided in the opening of the bearing casing 10 in order to restrain the volume of the magnetic fluid 10 from being decreased due to evaporation thereof. A space 18 is defined between the end face of the radial bearing 7 and the evaporation restraint panel 16.

The bearing part is charged therein with the magnetic fluid 19 up to a level which is as high as or slightly lower than the level of the upper end surface of the radial bearing 7. It is noted that the space 18 is provided for absorbing a volumetric expansion of the magnetic fluid 19 caused by a temperature rise. Since the space 18 is subjected to a dimensional restraint in the axial direction, it is devised that the space 18 has a diameter which is larger than the outer diameter of the bearing, as shown in the figure.

Detailed explanation will be hereinbelow made of a function of the bearing part in this embodiment. The radial bearing 7, the thrust bearing 9, the stopper ring 15 and the rotary shaft 6 are made of magnetically permeable materials, so that they are magnetized by the permanent magnet 8 (which is magnetized so as to have magnetic poles N, S in the axial direction). Thus, a magnetic flux stream M indicated by the dotted line M as shown in FIG. 4, can be obtained. Accordingly, the magnetic fluid 19 charged in the bearing part is trapped by being magnetically attracted to the radial bearing surface and the thrust bearing surface. Further, a magnetic path is obtained by the end face of the rotary shaft 6 and the surface of the thrust bearing 9, the magnetic attraction is axially effected. It is designed that the magnetic attraction force axially effected becomes a prepressure which is 3 to 5 times as large as the total weight of the rotary members such as the magnetic disc and the hub (the weight of a magnetic disc device in a personal computer is around 30 g).

Thus, the spindle motor A in this embodiment precisely and axially positions the magnetic disc by the magnetic attraction force, irrespective of its attaching posture. Further, the spindle motor can align the magnetic center of the rotor magnet 12 attached to the hub 11 with the magnetic center of the motor stator 13, thereby it is possible to substantially prevent the magnetic sound from being produced during rotation. Simultaneously, since the magnetic fluid is magnetized by the permanent magnet 8, the magnetic fluid 19 charged in the bearing part can be prevented from leaking from the bearing device.

Figure 5:
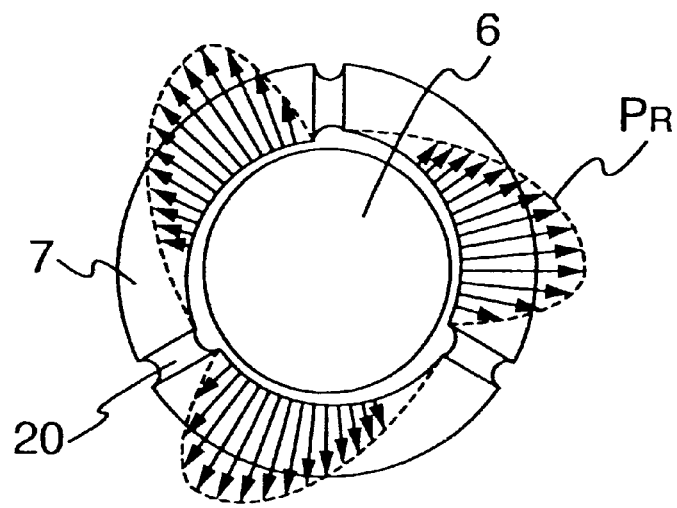
FIG. 5 is a sectional view illustrating a hydrodynamic fluid radial bearing used in the present invention.

FIG. 5 shows the hydrodynamic fluid radial bearing 7. The radial bearing 7 (three lobe bearing) is formed therein with oil grooves 20 at three different positions so as to communicate the inner surface of the bearing, opposite end faces of the bearing and the outer peripheral surface of the bearing are communicated with one another. The bearing inner surfaces between the oil grooves 20 formed in the bearing 7 are connected by concentric arcuate parts θ (having an angle of 20 to 30 deg.) which are fabricated with an arcuate radius concentric with the rotary shaft 6 and eccentric arcuate parts which are fabricated with an arcuate radius eccentric from the rotary shaft 6, and accordingly, the bearing has a composite arcuate surface composed of these two arcuate surfaces. This bearing will be referred as a composite three lobe bearing in this description.

The composite three lobe bearing produces a hydrodynamic pressure $P_R$ (which will be heinbelow referred to "hydrodynamic pressure) as show in the figure due to wedge action by an oil film of the magnetic fluid 19 which is trapped on the bearing surface by rotation of the rotary shaft 6. Accordingly, the shaft 6 is supported by the hydrodynamic pressures $P_R$ which are produced at three positions on the bearing surfaces. This hydrodynamic fluid radial bearing 7 is formed by precise fabrication with the use of a sintered material of an iron group or an iron-copper group. With the use of the above-mentioned material, the hydrodynamic fluid radial bearing 7 is magnetized by the permanent magnet 8 located in the bearing part. Accordingly, the magnetic fluid 19 is trapped on the bearing surface.

Further, since this composite three lobe bearing has the concentric arcuate parts θ which are fabricated with an arcuate radius concentric with the rotary shaft 6, a shock force can be supported by this concentric arcuate parts even when a shock of 1,000 G is exerted, and accordingly, the bearing surface is prevented from being deformed so that the bearing function is prevented from being deteriorated. Further, this hydrodynamic fluid bearing 7 has a relationship between the bearing inner diameter D and the bearing width L, which is set to L/D<1, and accordingly, vibration of the spindle motor can be restrained, in combination with the thrust bearing 9.

Figure 6:
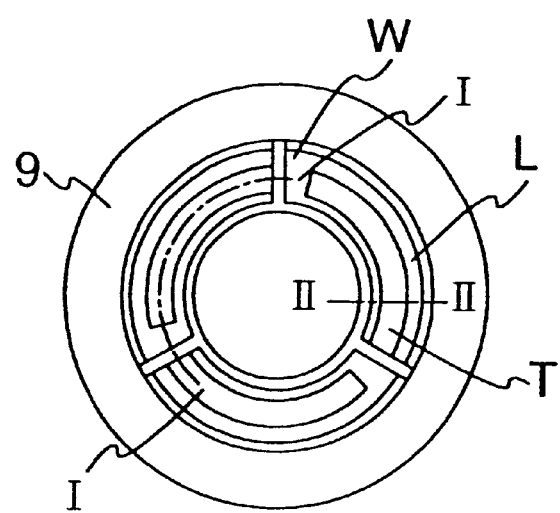
FIG. 6 is a plan view illustrating an essential part of a hydrodynamic fluid thrust bearing use in the present invention.
Figure 7A:
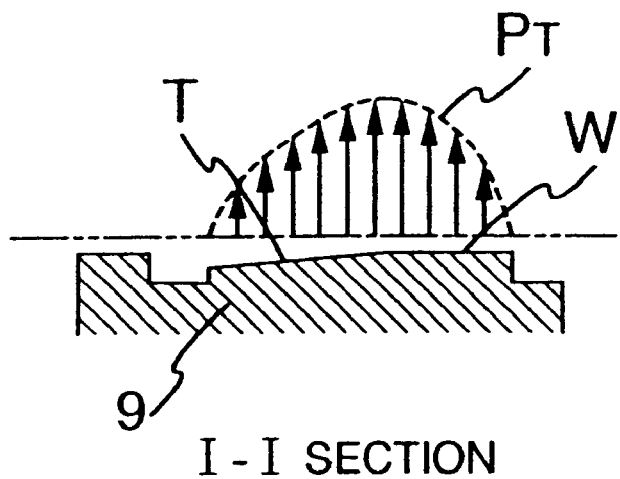
FIGS. 7a and 7b are sectional views along line I—I and line II—II in FIG. 5.
Figure 7B:
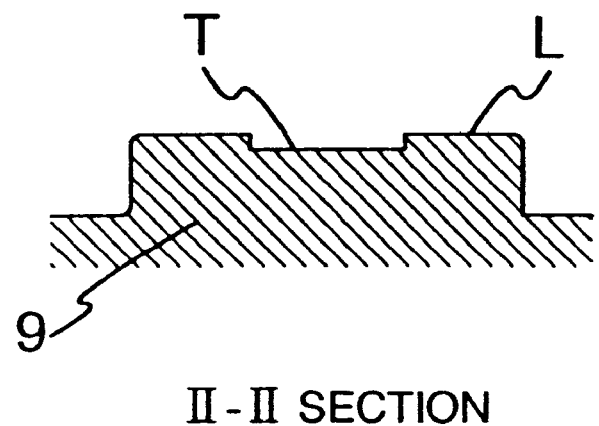

FIG. 6 shows an embodiment of the hydrodynamic fluid thrust bearing 9. Taper land bearing surfaces T are formed on the bearing slide surface for supporting the shaft 6, so as to produce hydrodynamic pressure. FIG. 7a is a sectional view along line I—I in FIG. 6, and FIG. 7b is a sectional view along line II—II in FIG. 6. That is, they are radially sectional views. As shown in FIG. 7a, taper surfaces T and non taper surfaces W are formed in the peripheral direction of the bearing surface, and accordingly, hydrodynamic pressure $P_T$ is produced by rotation of the rotary shaft 6, in order to support an axial load.

In the embodiment shown in FIG. 7b, flat surfaces L flush with the surface W are formed in the radial direction so as to enhance the load supporting function. Since the taper land thrust bearing 9 can produce the hydrodynamic pressure $P_T$ with no provision of such land parts exhibited by the flat surfaces L, the land parts may be formed as necessary. Further, in the taper land thrust bearing 9, a bearing loss is determined by a circumferential length of the taper lands and a taper depth of the taper lands, and accordingly, it is possible to aim at reducing the loss by increasing the circumferential length and the taper depth.

When the shaft 6 is rotated, the thrust bearing surface carries out contact slide motion upon starting or stopping although it occurs in a short time, and accordingly, with the repetitions of starting and stopping for long time, the bearing surface would be worn. Thus, the thrust bearing surface is coated thereover with ceramic coating such as TiN or TiC, according to the present invention, thereby it is possible to aim at preventing the bearing surface from being worn. Further, the thrust bearing 9 receives at its flat surfaces a shock force upon occurrence of an axial shock, and accordingly its bearing function is not deteriorated even though a shock of 1,000 G is exerted thereto, similar to the radial bearing 7.

Different from a bearing device which is used for conventional spindle motor for driving a magnetic disc, in the bearing device in the above-mentioned embodiment, the magnetic disc 3 is precisely supported by the shaft supporting mechanism which will be hereinbelow explained. That is, the above-mentioned magnetic disc device according to the present invention has a height $H_2$ of 12.5 mm in the case of the desk-top type personal computer. However, it has about 9.5 mm or 6.5 mm in the case of a note type personal computer. Accordingly, due to restriction to the axial dimensions, the size of the bearing casing 10 becomes about 5 mm, and accordingly, the width L of the radial bearing becomes about 1 to 2 mm. Meanwhile, in a conventional bearing device in which two radial bearings are provided, the bearing width becomes small in comparison with the bearing part according to the present invention even though a hydrodynamic groove bearing is used. Accordingly, it is difficult to exhibit a bearing stiffness even though the shaft 6 is precisely supported.

Figure 8:
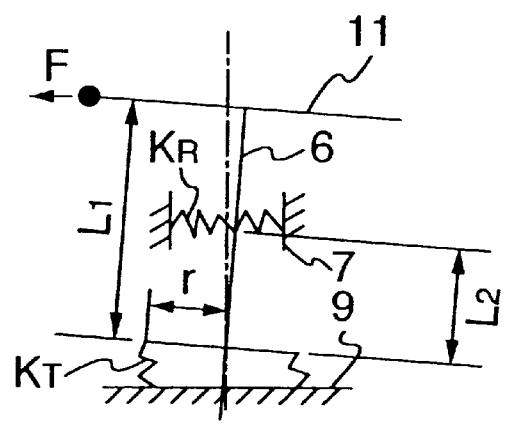
FIG. 8 is a view for explaining a vibration system in a bearing part according to the present invention.

Specifically, explanation will be made with reference to FIG. 8 which shows a vibration model of the shaft support mechanism according to the present invention.

As show in the figure, in the shaft support mechanism according to the present invention, vibration in a translation mode is restrained by a single radial bearing 7 (having a bearing stiffness $K_R$), and vibration in a conical mode is restrained by the thrust bearing 9 (having a bearing stiffness $K_T$). That is, the moment force of the thrust bearing is exhibited by $r*\delta*K_T$, where δ is a micro axial displacement of the thrust bearing surface. The diameter (2r) of the thrust bearing of the thrust bearing is determined so as to balance the moment force with a moment force F*I caused by unbalance of the rotary member. Specifically, if the housing 2 has a height of 6.5 mm, in the case of the magnetic disc device according to the present invention, I is about 4 mm, the diameter D of the radial bearing is 4 to 5 mm, and the bearing width L is 1 to 1.5 mm. That is, in the bearing device according to the present invention, with the relationship L/D<1, vibration in a conical mode can be restrained by the single thrust bearing. Thus, the radial bearing 7 may have a bearing stiffness which can only restrain vibration of the shaft 6 in a translation mode, and accordingly, the magnetic disc 3 can be precisely supported even though the width of the radial bearing 7 is set to the above-mentioned value.

The thrust bearing can have a spring constant KT of about 150 kg/mm if the thrust bearing 9 having a taper depth of several micron meters, and accordingly, the amplitude of vibration of the rotary shaft 6 may be restrained below an allowable value (0.5 μm) in view of the above-mentioned relationship. It is noted that if the above-mentioned relationship L/D is L/D<1, the single hydrodynamic fluid bearing 7 can restrain vibration in a translation motion in the bearing part according to the present invention, and accordingly, similar technical effects and advantages can be obtained even though a conventional hydrodynamic fluid groove bearing is used. Further, in the above-mentioned magnetic disc device according to the present invention, magnetic fluid is used as lubricant, but a bearing part in which usual lubrication oil is used, can similar technical effects and advantages.

Explanation will be hereinbelow made of the relationship between the above-mentioned bearing surface and the axial micro-displacement as a relationship between shaft deflection and the support thereof.

When the rotary shaft 6 (107 in the figures subsequent to FIG. 11), is rotated, the shaft is deflected by a degree of unbalance caused by a magnetic disc 3 (109 in the figures subsequent to FIG. 11) or a rotary member. The degree of unbalance caused by the magnetic disc 3 or the rotary member, is indicated by a concentrated mass on the magnetic disc 11 as shown in FIG. 8, and explanation of the shaft support mechanism will be made.

Figure 11:
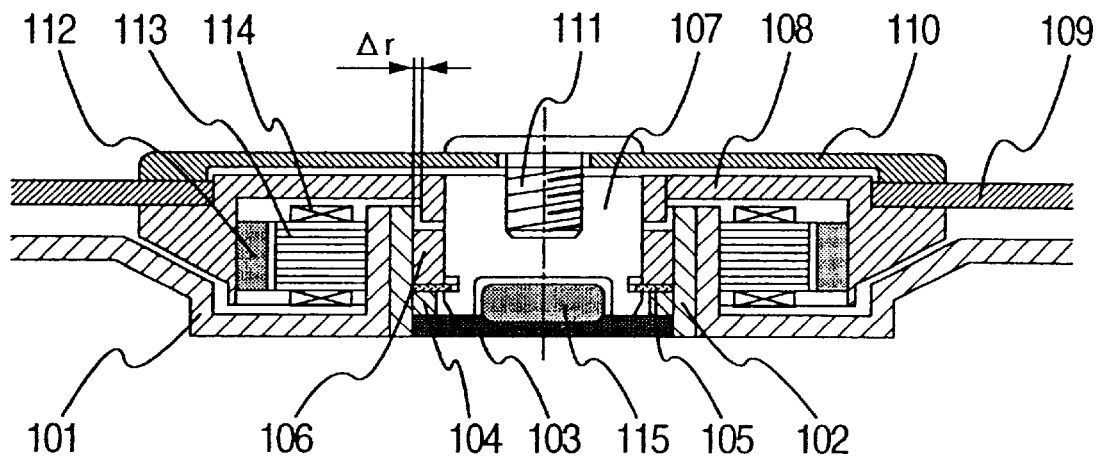
FIG. 11 is a longitudinal sectional view illustrating a structure of another spindle motor for a magnetic disc, according to the present invention.

An unbalance force F caused by the degree of unbalance is supported by the radial bearing 7 (106 in the figures subsequent to FIG. 11) and the thrust bearing 9 (103 in the figures subsequent to FIG. 11). Radial vibration, that is, vibration in the translation mode is restrained by a force $K_R*\delta_r$, where $\delta_r$ is a micro-displacement in a radial direction at the position of the radial bearing 7. Further, if $\delta_a$ is a micro-displacement in an axial r position, in the part of the thrust bearing 9, oscillatory vibration around an end of the rotary shaft 6 as an base point, that is, in the conical mode is restrained by a moment force $K_R*\delta_a*r$.

Thus, in the shaft support mechanism, a moment force $F*L_1$ caused by an unbalance of a rotary member is indicated by the following formula:

$$FL_1=K_R*\delta_r*L_2+K_T*\delta_a*r.$$

Thus, it is possible to restrain vibration of the rotary shaft with a high degree of accuracy by the single radial bearing 7 and the thrust bearing 9.

By the way, as mentioned above, the height $H_2$ of the housing becomes about 12.5 mm in the case of a desk-top type personal computer, but $H_2$=about 9.5 mm or 6.5 mm in the case of a note-type personal computer. Accordingly, due to axial dimensional restraint, the dimensions of the bearing casing 10 (102 in the figures subsequent to FIG. 11) is about 5 mm. If the height of the housing would be 6.5 mm, the height $H_2$ of the bearing casing 10 has to be smaller than 4 mm. Accordingly, in a conventional support mechanism in which vibrations in the translation mode and the conical mode are restrained by two radial bearings, it is difficult to obtain a bearing rigidity required for precisely support the rotary shaft 6 even though hydrodynamic fluid groove bearings are used.

In the shaft support mechanism according to the present invention, as mentioned above, since vibration in a translational mode is restrained by the single radial bearing 7 while vibration in the conical mode is retrained by the thrust bearing 9, the moment stiffness of the thrust bearing is enhanced by increasing the diameter of the rotary shaft 6, and the bearing loss is reduced by decreasing the bearing width L, thereby it is possible to obtain a required the stiffness of shaft supporting without increasing the bearing loss.

Specifically, in the shaft support mechanism according to the present invention, $L_1$ becomes around 3 mm in the case of the housing height $H_2$=6.5 mm. The diameter D of the radial bearing is increased to about a value in a range of about 4 mm to 5 mm, from a minimum diameter 3 mm of a conventional rotary shaft 6, in view of tolerance limits for the moment rigidity of the thrust bearing and the friction loss, and the bearing width L is set to be less than 1 mm or 2 mm, thereby it is possible to aim at ensuring a required support stiffness and reducing the bearing loss. That is, in the bearing device according to the present invention, the relationship is set to L/D<1. Even though the bearing width is reduced to about ⅓ of that of a conventional baring width, the radial bearing 7 is sufficient to support the vibration of the translation mode. Thus, as mentioned above, with such a condition that the bearing radial gap is less than 2 μm, a required radial bearing rigidity can be obtained even though the bearing width L is 1 mm. Further, it is possible to aim at reducing the bearing loss by decreasing the bearing width.

Further, in the bearing part according to the present invention, a composite three arc bearing having eccentric arcuate parts θ which are fabricated on the bearing surface with an arcuate radius concentric with the rotary shaft, and a bearing similar to the aforementioned bearing is used as the radial bearing. Thus, even though a shock force of about 1,000 G is exerted, the bearing surface is not deformed since the shock force is supported by the concentric arcuate parts, thereby it is possible to prevent the bearing function from being deteriorated. It is noted that when a shock force of 1,000 G is exerted, the radial bearing axially comes off since the radial bearing 7 is press-fitted in the bearing casing 10 as shown in, for example, FIG. 3. Further, since deformation of the bearing surface can be avoided, and so forth, the allowable limit of the bearing width L is 1 mm. It is noted that the bearing width L is an effective bearing width without dimensions of chamfering in the end parts of the bearing surface.

Meanwhile, the bearing stiffness $K_T$ of the thrust bearing ca become $K_T$=about 150 kg/mm, or higher than the value if the rotation shaft 6 having a diameter of 4 mm and the thrust bearing 9 having a tapered length of several micron meters are used, and accordingly, the amplitude of vibration of the rotary shaft 6 can be restrained to a value below an allowable value (0.5 μm) in combination with the effect by the stiffness of the above-mentioned radial bearing. By setting the above-mentioned relationship L/D in the bearing part according to the present invention to L/D<1, vibration in the translation mode of the shaft can be restrained with the use of the single hydrodynamic fluid bearing, and accordingly, similar effects can be obtained even though a conventional hydrodynamic fluid groove bearing is used. The bearing loss of the thrust bearing is similar to that obtained by a conventional shaft support mechanism since a thrust load is supported by the end face of the radial bearing 7 in the conventional support mechanism.

It is noted that the bearing part according to the present invention having the above-mentioned bearing dimensions, can restrain vibration of the rotary shaft 6, and accordingly, similar technical effects and advantages can be obtained even though a hydrodynamic fluid groove bearing is used. Further, in the magnetic disc device in this embodiment, the magnetic fluid is used for lubrication. However, similar technical effects and advantage can be obtained even though lubrication oil which is usually used is used.

Further, the thrust bearing device 9 supports with its flat surface a shock force upon axial shock, its bearing function is prevented from being deteriorated, even though a shock force of 1,000 G is exerted.

In the shaft support mechanism according to the present invention, the spindle motor and the magnetic disc can be thinned with a relationship L/D between the inner diameter D and the width L of the hydrodynamic fluid bearing, which is in the range of L/D=0.2 to 0.5 in view of the above-mentioned bearing dimensions.

Figure 9:
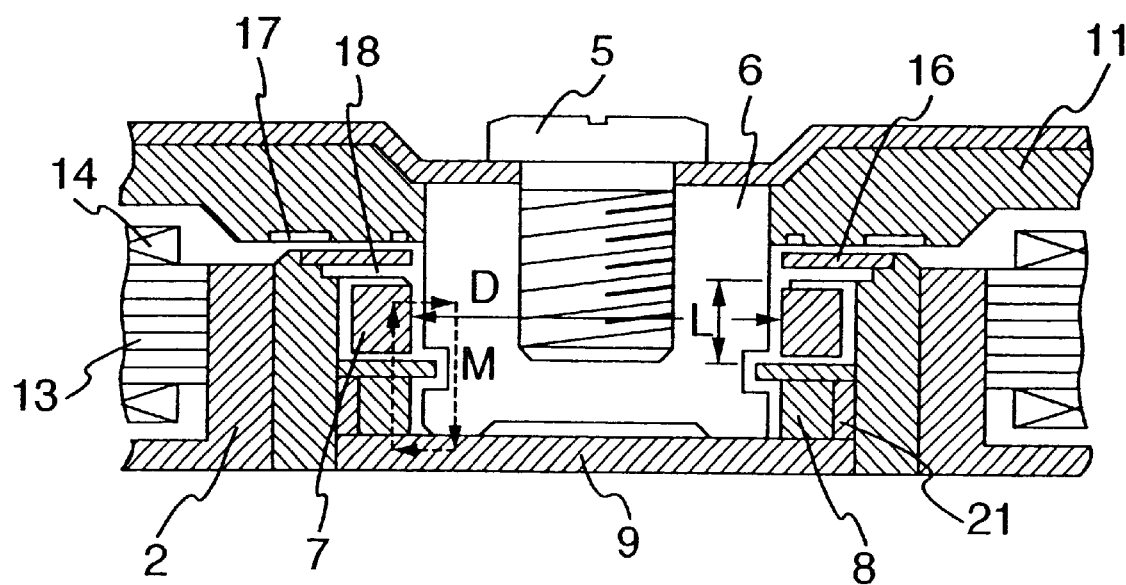
FIG. 9 is a longitudinally partly sectioned view illustrating a structure of a spindle motor for driving a magnetic disc according to the present invention.

FIG. 9 shows another embodiment of the present invention. In the embodiment shown in FIG. 3, the outer peripheral surface of the permanent magnet 8 provided in the bearing device 9, is covered with the thrust bearing 9, and accordingly, the magnetic circuit is short-circuited. Accordingly, the magnetic flux passing through the rotary shaft 6 is reduced. Thus, in the embodiment shown in FIG. 9, a ring-like magnetic insulator 21 is arranged at the outer periphery of the permanent magnet 8 so as to effectively run the magnetic flux through the shaft 6 side from the permanent magnet 8. The ring-like insulator 21 provided at the outer periphery of the permanent magnet 8 can adjust the magnetic flux passing through the shaft 6 side by setting the thickness and the axial width, and accordingly, the magnetic attraction force acting upon the shaft 6 can be adjusted.

Figure 12:
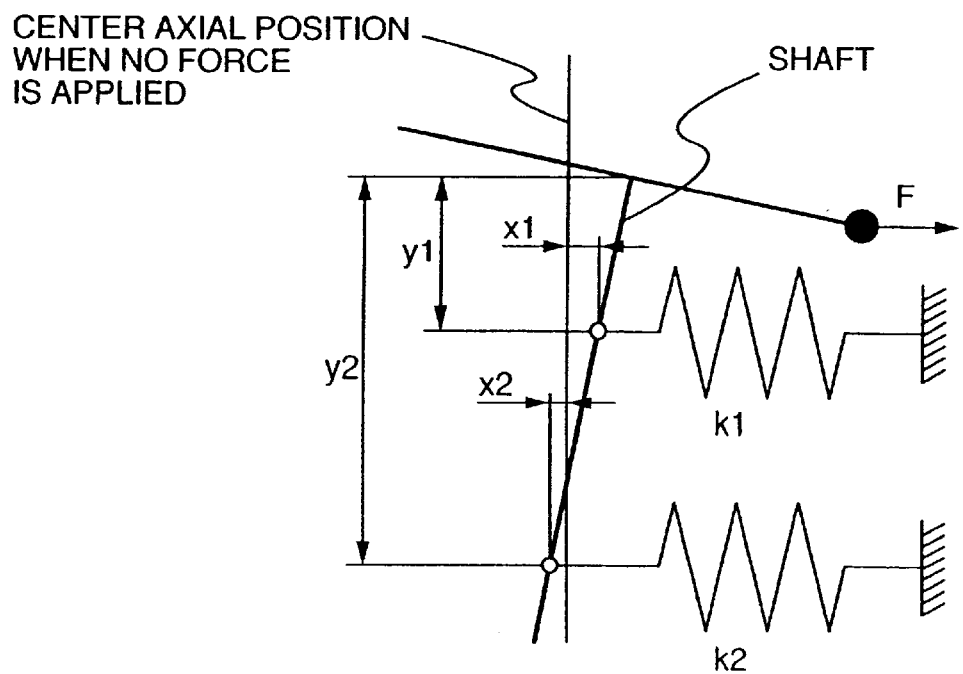
FIG. 12 is a view for explaining a bearing stiffness required for a conventional bearing.
Figure 13:
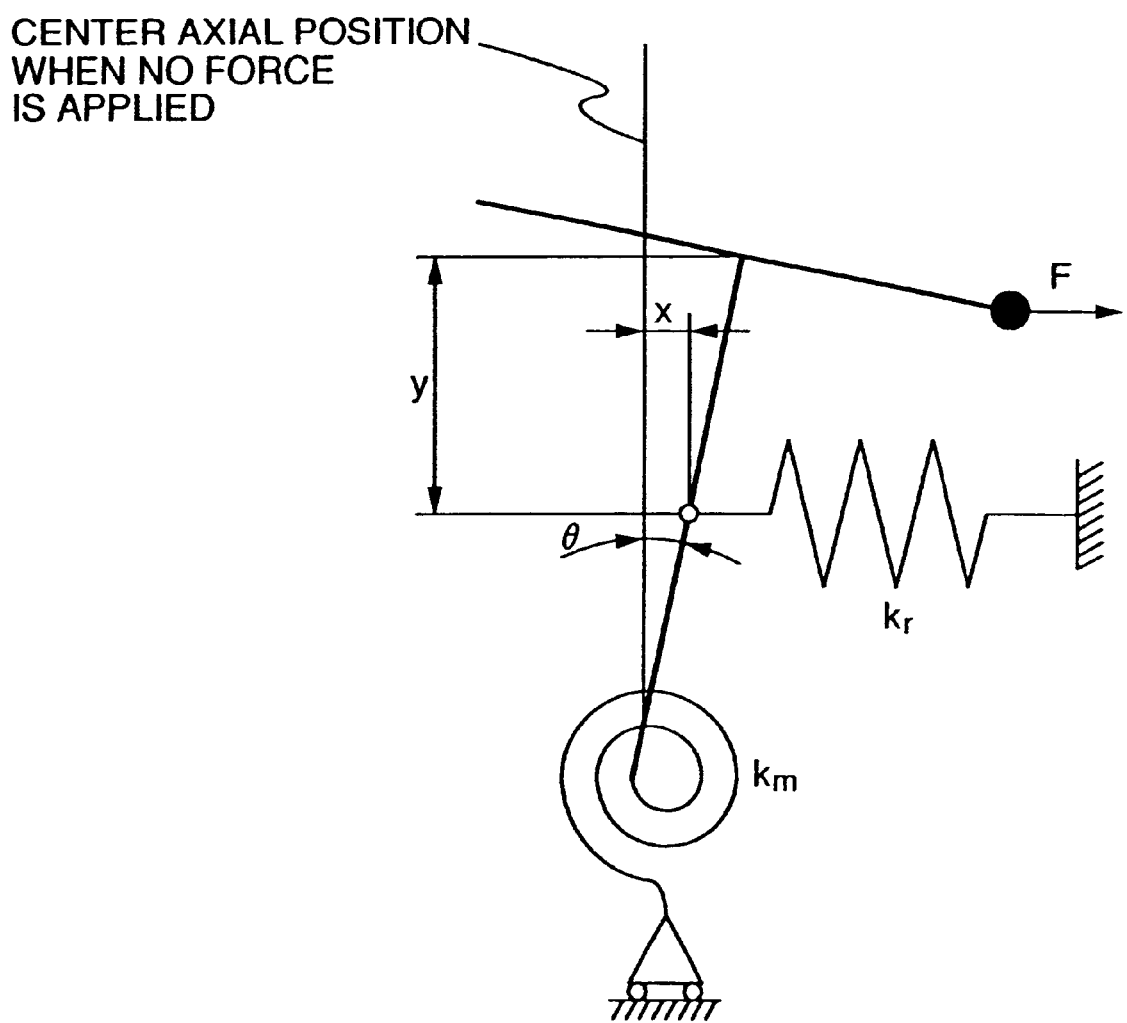
FIG. 13 is a view for explaining a bearing stiffness required for a bearing according to the present invention.
Figure 14A:
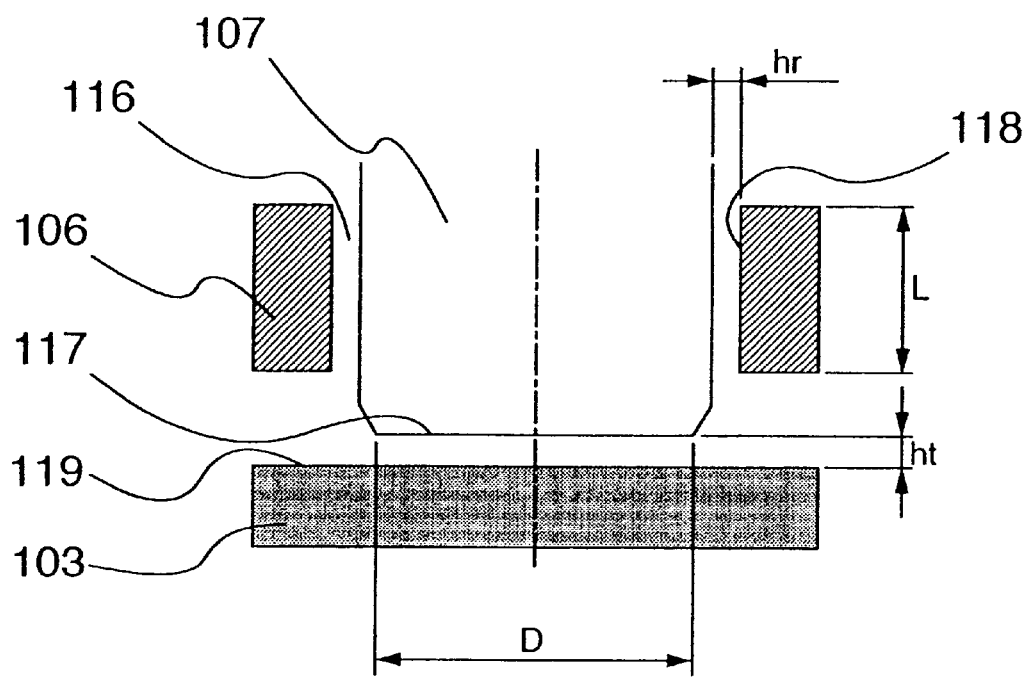
FIG. 14 is a view for explaining an operational principle of the present invention.
Figure 14B:
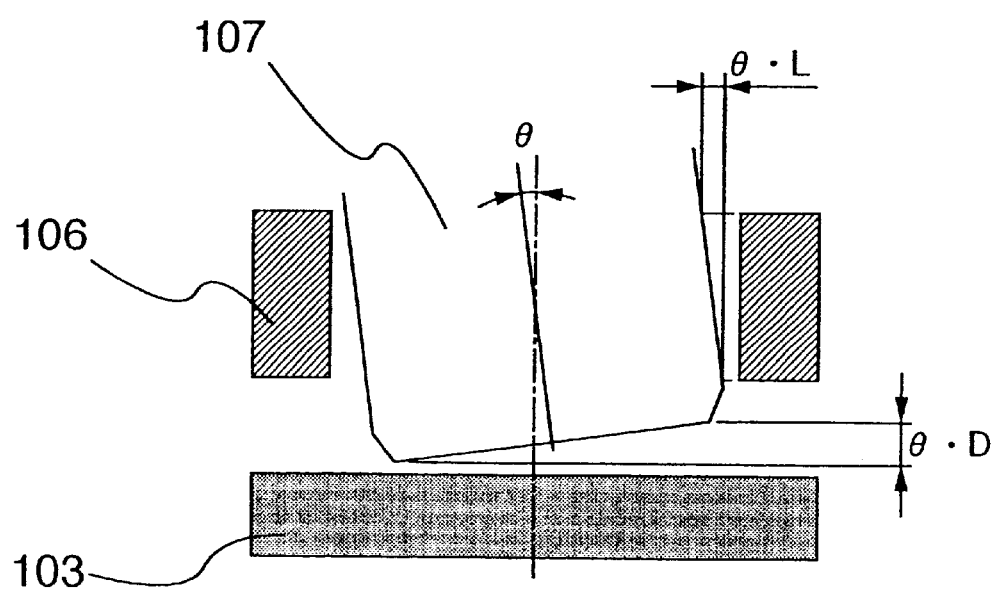
Figure 15A:
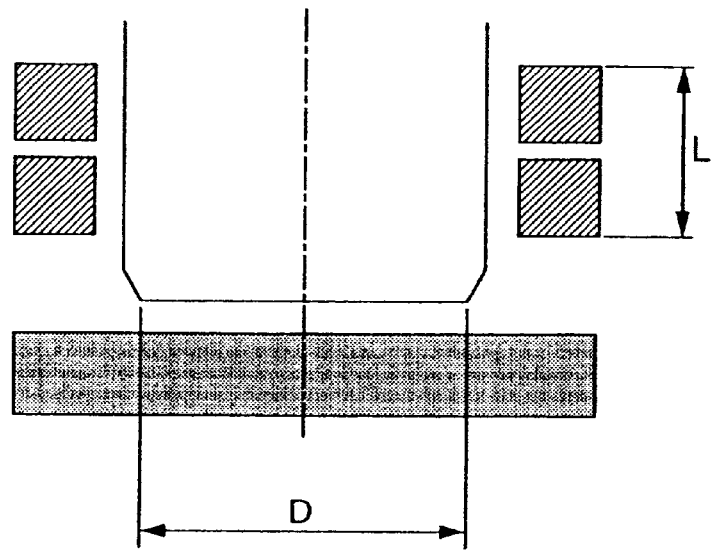
FIG. 15 is a view for explaining another operational principle of the present invention.
Figure 15B:
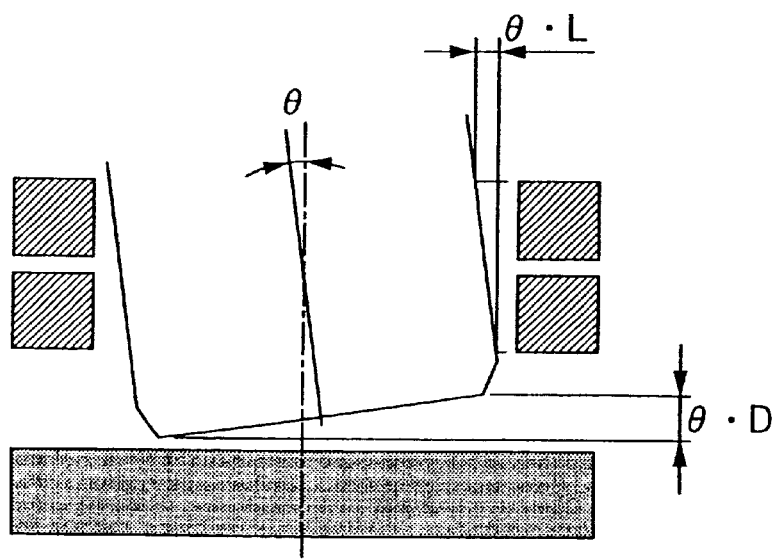

Explanation will be made of other embodiments of the present invention with reference to FIGS. 11 to 15. FIG. 11 is a sectional view which shows a spindle motor according to the present invention, FIG. 12 is a view for explaining a bearing stiffness which is required for a conventional spindle, FIG. 13 is a view for explaining a bearing stiffness required for a spindle according to the present invention, and FIGS. 14 and 15 are views for explaining reason why the diameter of the thrust bearing should be increased, rather than the width of the radial bearing.

Referring to FIG. 11, a housing 102 is fixed to 25 a base 101, and the housing 11 is fixed thereto with a thrust bearing 103, a spacer 104 and a radial bearing 106. A stopper ring 15 (105 in the figures subsequent to FIG. 11, and 123 in FIG. 16), is attached being interposed between the spacer 104 and the radial bearing 106. A shaft 107 is supported by the radial bearing 106 and the thrust bearing 103 so as to be rotatable around its center axis. The shaft 107 is fixed thereto with a hub 11 (108 in the figures subsequent to FIG. 11), and the hub 11 is fixed thereto with a magnetic disc 109 by means of a damper 4 (110 in the figures subsequent to FIG. 11) and a clamp screw 5 (111 in the figures subsequent to FIG. 1). The hub 108 has a cup-like shape, and is mounted therein with a rotor magnet 12 (112 in the figures subsequent to FIG. 11). The base 101 is attached thereto with a stator yoke 13 (113 in the figures subsequent to FIG. 11) which is wound thereon with a coil 14 (114 in the figures subsequent to FIG. 11). When a predetermined current runs through the coil 114, a torque is generated between the rotor magnet 112 and the coil 114, and accordingly, the hub 108 is rotated relative to the base 101. The thrust bearing 103 is fixed thereto with a prepressure magnet 115. The shaft 197 is made of martensitic stainless steel in view of antirust ability and wear-resistance with respect to the radial bearing 106 and the thrust bearing 103. The martensitic stainless steel is attracted at a room temperature by a magnet. A attraction force is effected between the prepressure magnet 115 and the shaft 107, and accordingly, the shaft 107 is pressed against the thrust bearing 103.

The inner surface of the radial bearing 106 may be that of a multi-lobe bearing such as a three lobe bearing, or a herringbone type groove bearing. In this case, the side surface of the shaft 107 becomes a simple cylindrical surface. On the contrary, a herringbone type groove bearing may be formed in the side surface of the shaft 107 while the inner surface of the radial bearing 106 may be a simple cylindrical surface. The relationship between the threat bearing 103 and the end face of the shaft 107 is similar. Between the radial bearing 106 and the shaft 107, and between the thrust bearing 103 and the shaft 107, lubrication oil is filled. When the shaft 107 is rotated, the above-mentioned multi-lobe surface or herringbone surface produces a pressure in the lubrication oil so as to support the shaft 107. By the pressure produced in the lubrication oil through the rotation of the shaft 107, the shaft 107 is floated up with a predetermined gap with respect to the thrust bearing 103. The larger the degree of this float-up, the higher the pressure produced in the lubrication oil filled in the rotary shaft 197 and the thrust bearing 103, that is, the smaller the degree of this float-up, the lower the pressure produced. As mentioned above, the shaft 107 is pressed against the thrust bearing 103, and accordingly, due to the condition of balance between a value obtained by integrating the pressure produced in the lubrication oil in the gap between the shaft 107 and the thrust bearing 103, and the above-mentioned pressing force, the degree of the float-up can be determined.

In the case of the application of the present invention in a data recording and reproducing device such as a magnetic disc device, a problem of leakage of lubrication oil is raised. The space $\Delta r$ between the housing 102 and the hub 108 is set to a small value of about 1 $\mu$m so that leakage of the lubrication oil is prevented by surface tension. Further, the prepressure bearing 115 is magnetized as shown in FIG. 11, and the thrust bearing 103 and the spacer 104 are made of a ferromagnetic material such as ferrite-group or martensite-group stainless steel so as to constitute a magnetic circuit composed of the prepressure magnet 115, the shaft 107, the radial bearing 106, the spacer 104 and the thrust bearing 103. Further, a magnetic fluid is used as the lubrication oil, and accordingly, the lubrication oil can be held between the shaft 107 and the radial bearing 106 and between the shaft 107 and the thrust bearing 103.

A predetermined bearing stiffness is required for each of the radial bearing 106 and the thrust bearing 103. The way of consideration for a bearing stiffness for a conventional bearing is shown in FIG. 12, and the bearing of the present invention will be explained in comparison with the conventional one. For example, in the arrangement of a conventional bearing as disclose in the Japanese Laid-Open No. H6-223494, a radial force is supported with the use of two radial bearing. In order to support the shaft against a centrifugal force acting upon unbalance of the shaft, inertia force caused by vibration or the like applied externally, it is required to take not only a radial force but also balance of moment into consideration. Referring to FIG. 12, the two bearings for supporting the shaft, that is, the upper and lower bearings have bearing stiffness of K1, K2, respectively. Estimating that the shaft is displaced at the positions of the upper and lower bearings by X1, X2, respectively, from the center axis of the shaft which has not yet been moved, when an external force F is exerted, and further, estimating that the absolute values of X1, X2 are sufficiently small, in comparison with y1, y2 shown in FIG. 12. Due to the balance between a force and a moment, $$x1 = \frac{y2}{y2 - y1} * \frac{F}{k1} \quad (1)$$

$$x2 = \frac{y1}{y2 - y1} * \frac{F}{k2} \quad (2)$$

are obtained. The absolute values of x1 and x2 should be set to below a predetermined value due to the nominal specification of the device, and accordingly, (1) F should be set to be small, (2) k1, k2 should be set to be large, (3) y2−y1 should be set to be large, and (4) y1 and y2 are should be set to be small. If the bearing having a structure shown in FIG. 12 is used in a thin magnetic disc device, it is, in particular, difficult to carry out the above-mentioned matters (2) and (3). In order to aim at decreasing the size of the device, the bearing width must be decreased. Accordingly, the bearing stiffness becomes inevitably smaller. Although it is principally possible to enhance the bearing stiffness by decreasing the bearing gap, the bearing gap is 2 to 3 μm if it is used in an usual magnetic disc, and accordingly, the decrease of the gap has to be limited in view of accuracy for fabrication. Further, in order to decrease the thickness of the device, it is required to decrease the value of y2−y1, and accordingly, x1, x2 have to be inevitably increased.

FIG. 13 shows the way of consideration of the bearing stiffness according to the present invention. In FIG. 13, there are shown a bearing stiffness kr of the radial bearing 106, and a moment stiffness km of the thrust bearing 103. It is noted here that the moment stiffness is exhibited by ΔM/Δθ where ΔM is a moment by which the center axis of the shaft 107 is returned in the direction normal to the outer surface of the thrust bearing 103 after the center axis of the shaft 107 is inclined by an angle of Δθ with respect to the direction normal to the outer surface of the thrust bearing 103. In the arrangement according to the present invention, in order to bear against a centrifugal force acting upon unbalance of the shaft, or an inertia force caused by externally applied vibration or the like, not only the balance to a radial force but also the balance to the moment should be taken into consideration. According to the present invention, the moment stiffness km of the thrust bearing 103 copes with the balance to the moment while the bearing stiffness kr of the radial bearing 106 copes with the balance to the force.

Now estimating that the upper and lower bearings in FIG. 12, and the radial bearing 106 in FIG. 11 have identical dimensions, their bearing stiffness k1=k2=Kr, and further estimating that the degree of the external force is equal between the system shown in FIG. 12 and the system shown in FIG. 13, x shown in FIG. 13 is exhibited as $$x = \frac{F}{Kr} \quad (3)$$

In the system shown in FIG. 12, if the center of the external force F is located between the two bearings, it is clear that the absolute values of x1 and x2 are smaller than the absolute value of X. However, in an actual 2.5 inch magnetic disc device, it is difficult to set the gravitational center of the rotary part and the center of unbalance between the two bearings. Further, the thinner the device, the smaller the degree of freedom, it is actually difficult set the center of the external force F between the two bearings in a thin magnetic disc device. Thus, in a thin magnetic disc device, the absolute value of x can be smaller than those of x1 and x2. Further, in the radial bearing, in order to obtain a predetermined rigidity, a predetermined bearing width is required in principle. However, there is no limit in the axial direction in principle as to the moment stiffness of the thrust bearing. Accordingly, the arrangement shown in FIG. 13 is preferable for a thinner magnetic disc device, rather than the conventional arrangement shown in FIG. 12.

Further, in order to practically realize the arrangement shown in FIG. 13, consideration shown in FIG. 14 is required. In the explanation to the arrangement shown in FIG. 13, km is the moment rigidity of the thrust bearing. However, the moment rigidity is owned not only by the thrust bearing 103 but also even by the radial bearing 106. The reason why the radial bearing 106 and the thrust bearing 103 have moment rigidities is such that the thickness of the film of the lubrication oil varies when the shaft is inclined as shown in FIG. 14. In the upper part of FIG. 14, gaps are present between the shaft 107, the thrust bearing 103 and the radial bearing 106, and these gaps are filled therein with the lubrication oil. In the lower part of FIG. 14, if the shaft 107 is inclined by an angle θ (where the absolute value of θ is sufficiently smaller than 1), the gaps between the radial bearing 106 and the shaft 107 differ from each other by θ*L between the upper part and the lower part of the radial bearing 106. In general, the smaller the thickness of the film of the lubrication oil, the higher the hydrodynamic pressure produced in the film of the lubrication oil, the hydrodynamic pressure of the lower side of the bearing is higher than that of the upper side of the bearing on the right side of the shaft, and the hydrodynamic pressure of the upper side of the bearing is higher than that of the lower side of the bearing on the left side of the shaft, as shown in FIG. 14. Thus, the a moment adapted to turn the shaft 107 clockwise as viewed in FIG. 14 is produced. This exhibit the moment stiffness of the radial bearing 106. In the lower part of FIG. 14, if the shaft 107 is inclined by an angle θ (where the absolute value of θ is sufficiently smaller than 1), the gaps between the thrust bearing and the shaft 107 differ from each other by θ*D between the right side and the left side of the thrust bearing. In general, the smaller the thickness of the oil film, the higher the hydrodynamic pressure produced in the film of the lubrication oil, in the thrust bearing 103, the hydrodynamic pressure produced on the left side of the shaft becomes higher than that produced on the right side thereof, as shown in FIG. 14. Thus, a moment adapted to turn the shaft 107 clockwise as viewed in FIG. 14 is produced. This exhibits the moment stiffness of the thrust bearing 103.

If the thickness of the device is to be decreased, the width L of the radial bearing must be smaller. In this case, the difference θ*L in the oil film between the upper and lower parts of the radial bearing 106 becomes smaller. Further, as to the moment which can be obtained by integrating the value obtained by multiplying the hydrodynamic pressure of the oil film with an arm length, the arm length is inevitably smaller, and accordingly, the moment stiffness of the radial bearing 106 becomes extremely small.

Thus, the concept of the present invention is such that the balance to the moment is obtained not by the radial bearing but by the thrust bearing. In order to enable this fact, it is at least necessary that the moment stiffness of the thrust bearing 103 becomes larger than that of the radial bearing. With the further consideration, the cause of the moment stiffness is a variation in the thickness of the oil film which is exhibited by inclination of the shaft, and accordingly, in order to increase the bearing stiffness, it is necessary to increase the variation in the thickness of the oil film at the same inclination angle. That is, the variation θ*D in the thickness of the oil film in the thrust bearing 103 should be larger than the variation θ*L in the thickness of the oil film in the radial bearing 106. From this fact, the condition D>L is introduced.

The derivation of the condition D>L is implicitly based upon such an estimation that the bearing gap hr in the radial bearing is substantially equal to the bearing gap ht in the thrust bearing. For example, in such a condition as hr>>ht, the moment stiffness of the radial bearing 106 can be, in principle, larger than that of the thrust bearing 103. However, in view of a problem of accuracy of fabrication for the components, a bearing having such a condition as hr>>ht can hardly be actually obtained, and accordingly, the condition D>L is required for making the moment stiffness of the radial bearing 106 larger than that of the thrust bearing 103. If numerical values are specifically enumerated, in a bearing for the magnetic disc, hr becomes about 2 to 3 μm. The degree of right angle of the upper surface 119 of the thrust bearing 103 with respect to the inner surface 118 of the radial bearing 106 is about 2 to 3 μm at the utmost limit with normal fabricating tolerance, and the degree of right angle of the end face 117 with respect to the side surface 116 of the shaft 107 is similar. It is necessary that the bearing gap ht becomes larger the sum of the degree of the upper surface 119 of the thrust bearing 103 with respect to the inner surface 118 of the radial bearing 106, and the degree of right angle of the end face 117 with respect to the side surface 106 of the shaft 107, and it is typically required to be greater than 5 μm. Thus, it is not practical to constitute a bearing having such a condition as hr>>ht.

Further, in such a case a groove bearing or a multi-lobe bearing such as a three lobe bearing is used for the radial bearing 106 and the thrust bearing 103, the bearing gaps hr, ht maximumly affect upon the characteristics of the bearing although the condition varies more or less by design parameters for the bearing, and accordingly, in view of the above-mentioned discussion, it is practically difficult to make the moment stiffness of the radial bearing 106 higher than that of the thrust bearing 103 without such a condition as D>L.

In FIG. 14, although explanation has been made such that only one of the radial bearing is used, the same discussion can be applied in such a case that two radial bearings are used if the bearing width L can be taken from the lower surface of the lower bearing up to the upper surface of the upper bearing as shown in FIG. 15.

Figure 16:
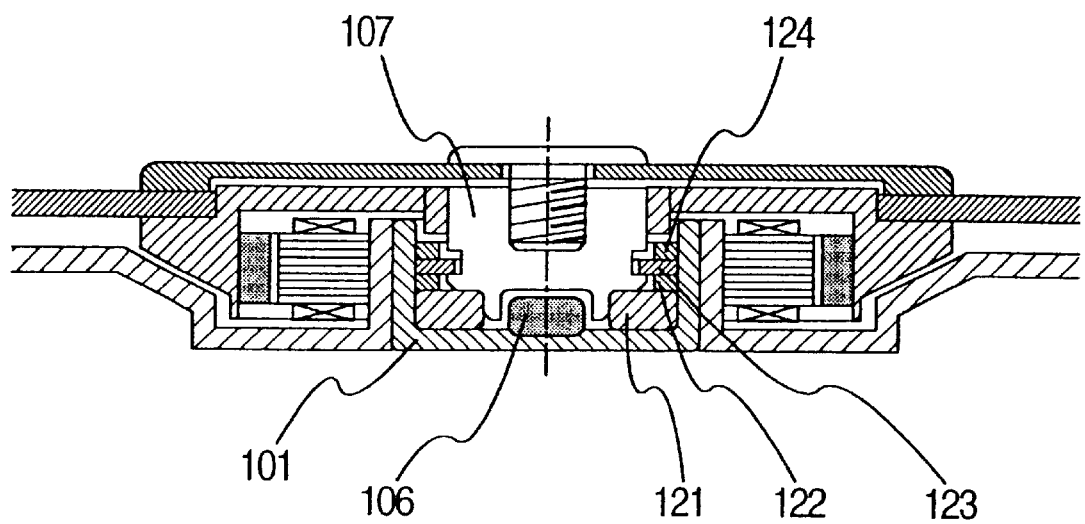
FIG. 16 is a longitudinally sectional view illustrating a structure of another spindle motor for driving a magnetic disc, according to the present invention.

Explanation will be made of another example in the configuration of the embodiment of the present invention with reference to FIG. 16. In this embodiment, the shape of the housing 102 attached to the base 101, the configuration in the housing 102 and the shape of the shaft 107 are different, in comparison with the embodiments which have been explained with reference to FIGS. 11 to 15. Although the housing 102 shown in FIG. 11 has a cylindrical shape, the housing 102 shown in FIG. 16 has a cup-like shape. Although there would be a risk of leakage of the lubrication oil between the housing 102 and the thrust bearing 103 in the structure shown in FIG. 11, there is no such a risk in the structure shown in FIG. 16. The housing 102 in the structure shown in FIG. 16, can be inexpensively manufacture by plastic working such as deep drawing.

Further, in this embodiment, a bearing metal 121 which is a bearing member having two bearing functions is used. In this arrangement, a radial bearing is formed in the inner surface of the bearing metal 121 (which corresponds to 9 shown in FIG. 3 or 103 shown in FIG. 11), and a thrust bearing is formed in an end face thereof, and accordingly, the shaft 107 is supported by the single bearing metal 121. On the contrary, in the arrangement shown in FIG. 11, the shaft 107 is supported by two components, that is, the radial bearing 106 and the thrust bearing 103. In the example shown in FIG. 11, there is a problem such that the degree of right angle of the thrust bearing 103 have to be obtained with respect to the center axis of the radial bearing 106. In the example shown in FIG. 16, since the radial bearing and the thrust bearing are formed in the bearing metal 121 as a single piece component, it is relatively easy to obtain the degree of right angle.

A stopper ring 123 is mounted on the bearing metal 122, being clamped between a spacer 122 and a retainer plate 124.

Since the shaft 107 is supported by the bearing metal 121, the shaft is stepped. The shaft 107 is made of ferromagnetic materials, and is pressed against the bearing metal 1 by the prepressure magnet 115.

Even in this embodiment, the diameter of the thrust bearing is smaller than that of the radial bearing, similar to the afore-mentioned embodiment.

Figure 17:
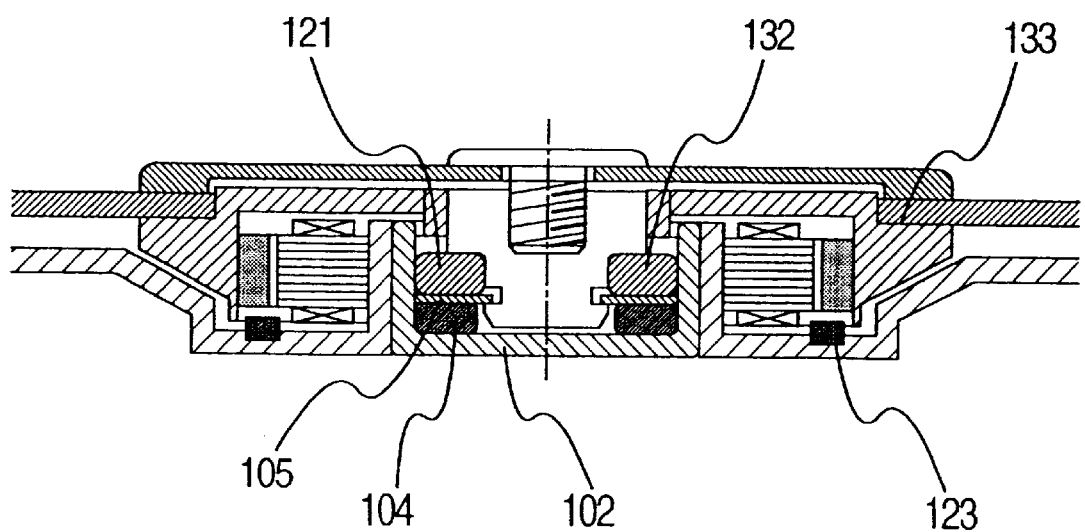
FIG. 17 is a longitudinally sectional view illustrating a structure of another spindle motor for driving a magnetic disc, according to the present invention.

Explanation will be hereinbelow made of another embodiment with reference to FIG. 17. In this embodiment, the configuration of the housing 102 and the way of applying prepressure to the thrust bearing are different in comparison with the arrangement shown in FIG. 16. In the housing 102, a stopper ring 105 is provided being clamped between a spacer 104 and a bearing metal 121. As to the structure of the bearing metal is similar to that in the arrangement shown in FIG. 16.

Further in this embodiment, the bearing metal 121 is provided thereto with an iron piece 131 as a ferromagnetic member for applying prepressure in the axial direction of the thrust bearing. That is, a magnetic force effected between the iron piece 131 and the rotor magnet 112 serves as a prepressure. Accordingly, the iron piece may be a ring-like member, and may be formed of members obtained by splitting the ring-like member.

Even in this embodiment, the diameter of the thrust bearing is smaller than the width of the radial bearing, similar to the afore-mentioned embodiments.

Figure 18:
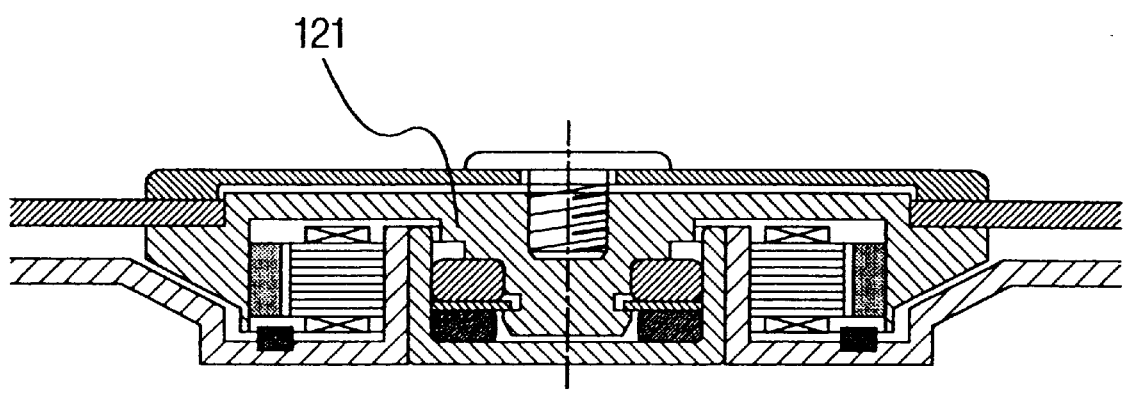
FIG. 18 is a longitudinally sectional view illustrating a structure of another spindle motor for driving a magnetic disc, according to the present invention.

Explanation will be made of another embodiment with reference to FIG. 18. This embodiment is similar to the arrangement shown in FIG. 17, except that an integral hub 141 as a single member in which the shaft 107 is integrally incorporated with the hub 108 is used. In the embodiment shown in FIG. 17, there would be a problem in the parallelism of the surface 132 of the shaft 107, which makes contact with the thrust bearing of the bearing metal 121, with respect to the surface 133 of the hub 103, which supports a magnetic disc 109. In FIG. 18, the parallelism can be easily obtained since there is used the integral hub 114 in which the shaft 107 and the hub 103 shown in FIG. 17 are integrally incorporated with each other.

Even in this embodiment, the diameter of the thrust bearing is smaller than the width of the radial bearing, similar to the afore-mentioned embodiments.

In the magnetic disc device according to the present invention, the spindle motor for driving a magnetic disc can rotatably support the rotary shaft in combination of the single hydrodynamic fluid radial bearing and the hydrodynamic fluid thrust bearing, which are excellent in durability, and vibration in an axial translational mode among the vibration components caused by unbalance force exerted to the rotary shaft can be supported by the radial bearing while vibration in a conical mode is supported by the thrust bearing. Thus, the spindle motor for driving a magnetic disc and the magnetic disc device can be thinned.

Further, as to the lubrication and the sealing of the bearing device, the magnetic fluid is used as lubrication oil for the bearing, and the rotary shaft, the radial bearing and the thrust bearing which are magnetically permeable, are used while the permanent magnet is held between the radial bearing and the thrust bearing so as to magnetize the bearings and the magnetic fluid. With this arrangement, the magnetic fluid can be held on the bearing surface. Thus, the fluid lubrication and the sealing ability can be surely maintained, and accordingly, the higher recording density and the long use life of the spindle motor can be obtained by preventing the contamination of the magnetic disc and by maintaining precise rotation, thereby it is possible to provide a highly reliable magnetic disc unit.

Further, since the permanent magnet is located in the bearing part so as to induce a magnetic attraction force between the rotary shaft and the thrust bearing in order to carry out axial positioning, the magnetic centers of the motor driving permanent magnet and the armature/stator can be aligned with each other, and accordingly, it is possible to aim at lowering noise from the magnetic device. Further, since the magnetic disc device as mentioned above, can be used in any arbitrary posture, and since the hydrodynamic fluid bearings which are excellent in the shock resistance are used, the portability thereof can be enhanced, and further, with the provision of the novel structures including the radial bearing and the thrust bearing, it is possible to provide thin electronic devices including note type thin personal computers.

What is claimed is:

1. A spindle motor used in a magnetic disc apparatus comprising:
   a hub to which a magnetic disc is mounted; and
   a rotary shaft to which the hub is fixed;
   wherein said rotary shaft is located in a bearing casing having one end opened and the other end closed by a hydrodynamic pressure thrust bearing having a bearing slide surface, said rotary shaft being supported by a hydrodynamic pressure radial bearing and the hydrodynamic pressure thrust bearing, and an inner diameter D and a width L of the hydrodynamic pressure radial bearing having a relationship of L/D<1.

2. A spindle motor according to claim 1, wherein said hub is formed with a spiral groove, and lubrication oil is charged in said bearing casing.

3. A spindle motor according to claim 2, wherein a ring-like plate is interposed between said hub and said bearing casing.

4. A spindle motor according to claim 3, wherein said ring-like plate is a permanent magnet.

5. A spindle motor according to claim 2, wherein said lubrication oil is magnetic fluid.

6. A spindle motor according to claim 2, wherein said radial bearing is formed therein with an oil groove.

7. A spindle motor according to claim 1, wherein said L/D is in a range of 0.2 to 0.5.

8. A spindle motor according to claim 1, wherein said bearing casing is provided therein with a permanent magnet for exerting a force to said rotary shaft in the axial direction of the latter.

9. A spindle motor according to claim 1, wherein said bearing casing is made of nonmagnetic material.

10. A spindle motor according to claim 1, wherein said bearing slide surface is formed therein with a taper land.

* * * * *

UNITED STATES PATENT AND TRADEMARK OFFICE
CERTIFICATE OF CORRECTION

PATENT NO. : 6,680,814 B2
DATED : January 20, 2004
INVENTOR(S) : Nii et al.

It is certified that error appears in the above-identified patent and that said Letters Patent is hereby corrected as shown below:

Title page,
Item [60], Related U.S. Application Data, should read:
-- This is a continuation of U.S. application Serial No. 09/504,043, filed February 14, 2000, the subject matter of which is incorporated by reference herein and is related to U.S. application Serial No. 10/214,576, filed August 9, 2002, which is a divisional application of U.S. application Serial No. 09/504,043, now U.S. Patent No. 6,469,866. --.

Signed and Sealed this

Twenty-fourth Day of January, 2006

JON W. DUDAS
*Director of the United States Patent and Trademark Office*

UNITED STATES PATENT AND TRADEMARK OFFICE
CERTIFICATE OF CORRECTION

PATENT NO. : 6,680,814 B2
DATED : January 20, 2004
INVENTOR(S) : Nii et al.

It is certified that error appears in the above-identified patent and that said Letters Patent is hereby corrected as shown below:

Title page,
Item [60], Related U.S. Application Data, should read:
-- [60] This is a continuation of U.S. application Serial No. 09/504,043, filed February 14, 2000, the subject matter of which is incorporated by reference herein and is related to U.S. application Serial No. 10/214,576, filed August 9, 2002, which is a divisional application of U.S. application Serial No. 09/504,043, now U.S. Patent No. 6,469,866. --.

Signed and Sealed this

Seventh Day of February, 2006

JON W. DUDAS
*Director of the United States Patent and Trademark Office*